March 10, 1942.    F. L. LE BUS    2,275,911
RETRIEVER TOOL
Filed Feb. 14, 1941    3 Sheets-Sheet 1

Franklin L. LeBus
INVENTOR.
BY John M. Spellman
ATTORNEY.

Franklin L. LeBus
INVENTOR.
BY John M. Spellman

March 10, 1942.  F. L. LE BUS  2,275,911
RETRIEVER TOOL
Filed Feb. 14, 1941   3 Sheets-Sheet 3
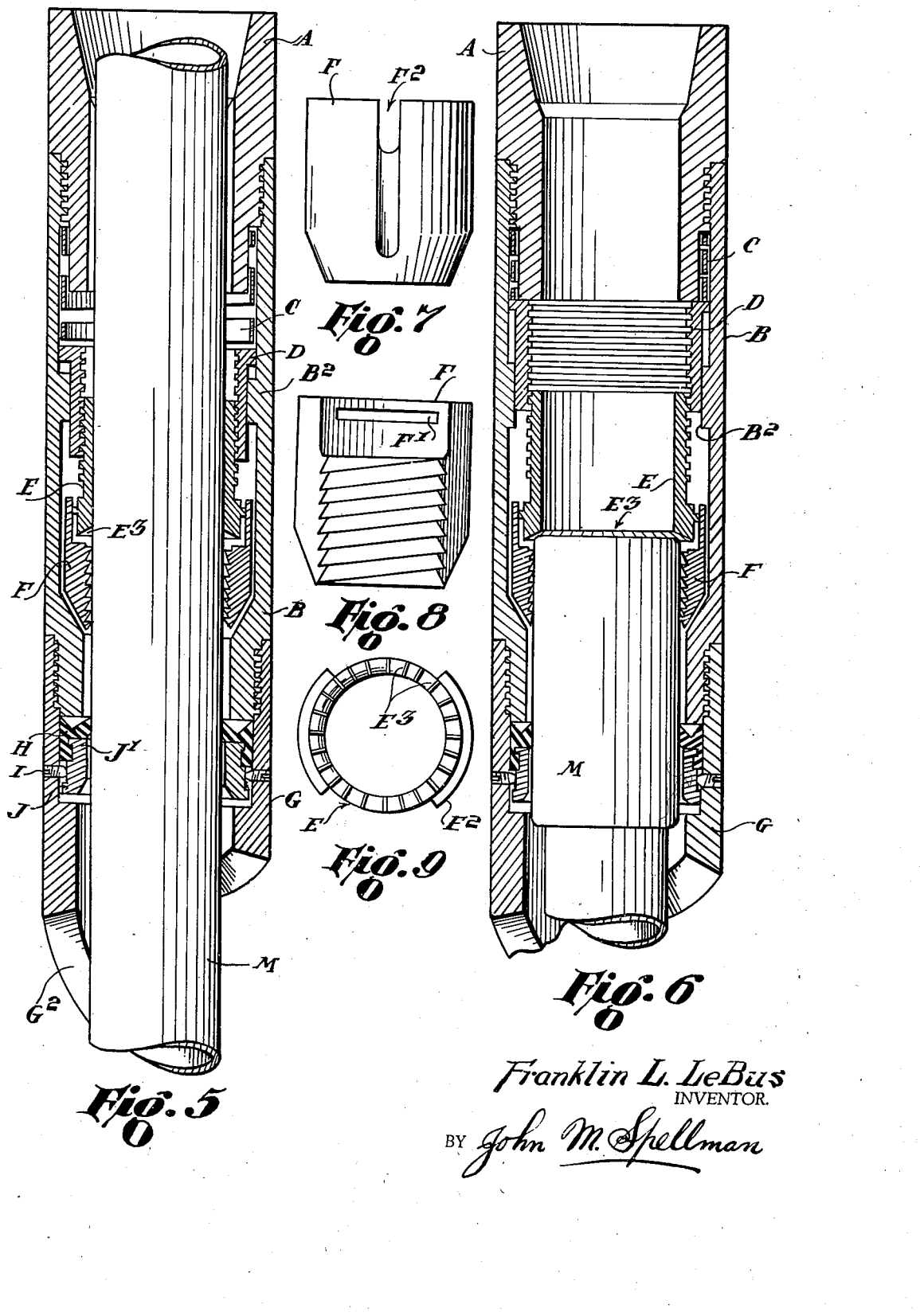
Franklin L. LeBus
INVENTOR.
BY John M. Spellman Patented Mar. 10, 1942

2,275,911

UNITED STATES PATENT OFFICE 2,275,911

RETRIEVER TOOL

Franklin L. Le Bus, Longview, Tex.

Application February 14, 1941, Serial No. 378,842

3 Claims. (Cl. 294—102)

This invention relates to fishing tools for oil wells for recovering broken and lost pipe in deep wells.

The invention relates more particularly to that type of fishing tools for oil wells known as "overshots," and in such connection the fishing tool hereinafter illustrated and described in detail consists of a novel and improved means for recovering lost pipe, tool joints, rotary bits, and the like.

In deep well drilling it is a very common occurrence for the drilling pipe to break off and become lost during the drilling operation. And because of the great depths being penetrated it is common for lost pipe to become stuck in the hole and become immovable, consequently when a fishing tool is connected to this lost pipe there must be as much assurance as possible that the fishing tool can be released if desired in case it is found impossible to withdraw the lost pipe.

The present invention aims to provide a fishing tool for recovering lost pipe which is a distinct improvement over tools of this character now in use, in that while the tool is capable of gripping lost tools and pipe in a well, the tool is also capable of being released from the lost pipe or other object, in case it is found impossible to bring it out of the well and thus the operating string of pipe can be salvaged.

Other objects and advantages of the improved overshot well fishing tool will become apparent from a perusal of the following detailed description, taken in connection with the accompanying drawings, and in the drawings:

Figure 5 is a similar view of 1, 2 and 3 showing the fishing tool with a lost pipe engaged in the jaws of the teeth, this view also showing that the plain pipe which in some cases is broken at the top will go up into the tool so that a solid section of the pipe may be engaged;

Figure 6 is a vertical sectional view of the fishing tool showing how the slips may be forced into positive engagement with the tool joint with the purpose of turning the lost string to the left for backing it off in a case where it is stuck and cannot be pulled;

Figure 7 is an elevational view of the gripping members in assembled position;

Figure 8 is an elevational view of one of the gripping members;

Figure 9 is a bottom view of the releasing stem.

Figures 1, 2:
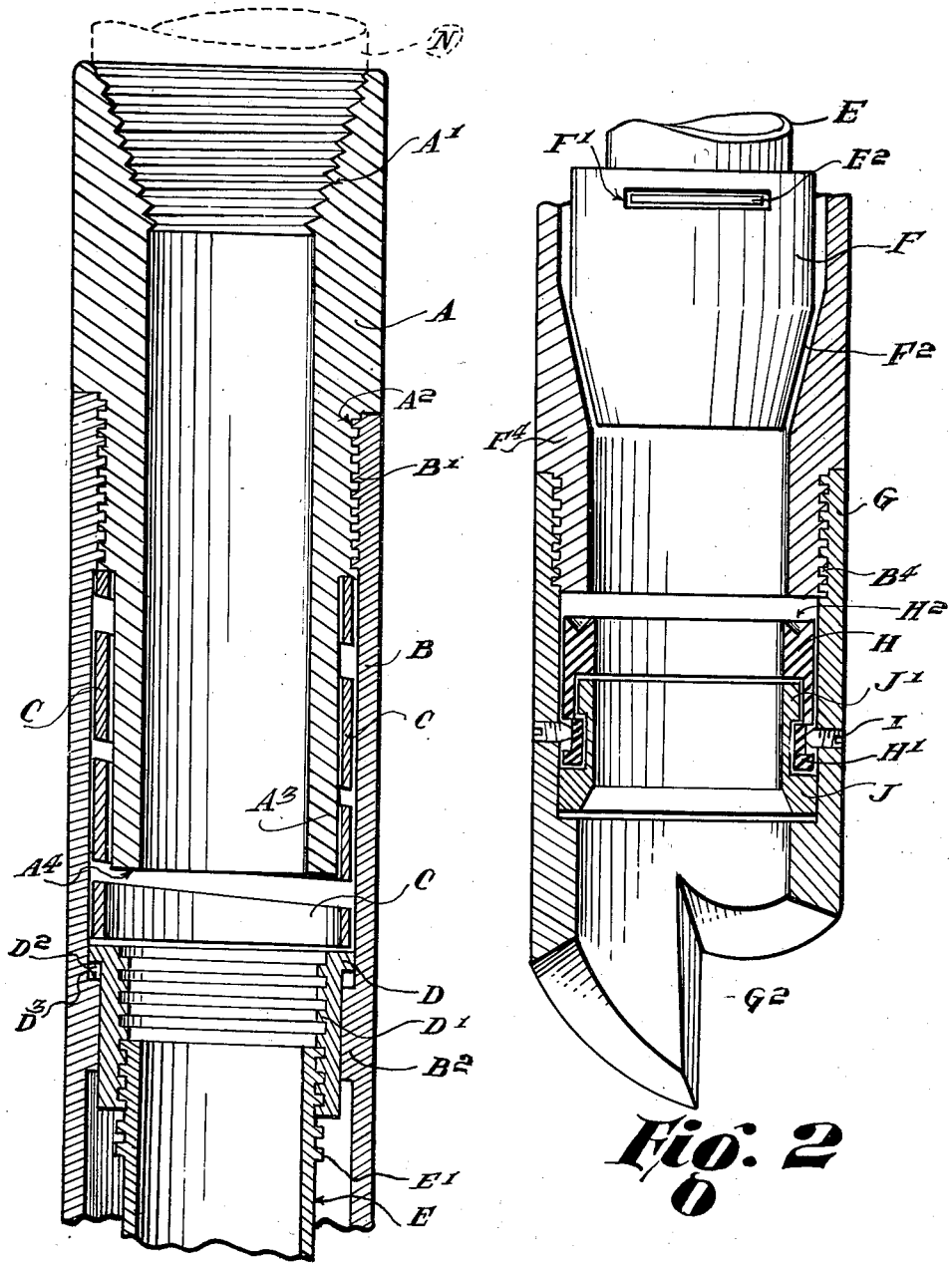
Figure 1 is a vertical sectional view taken through the fishing tool.
Figure 2 being a continuation of Figure 1.
Figure 3:
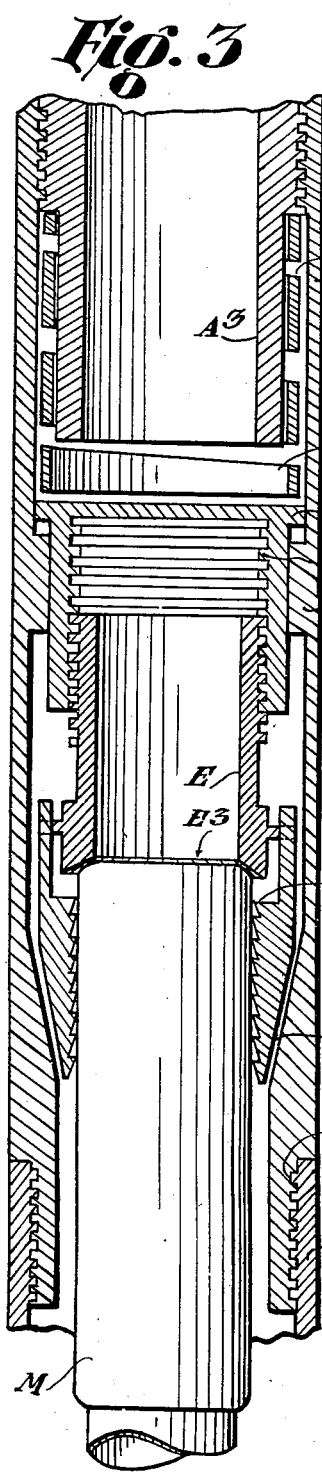
Figure 3 is a view similar to Figures 1 and 2 showing the tool joint engaged in the slips.
Figure 4:
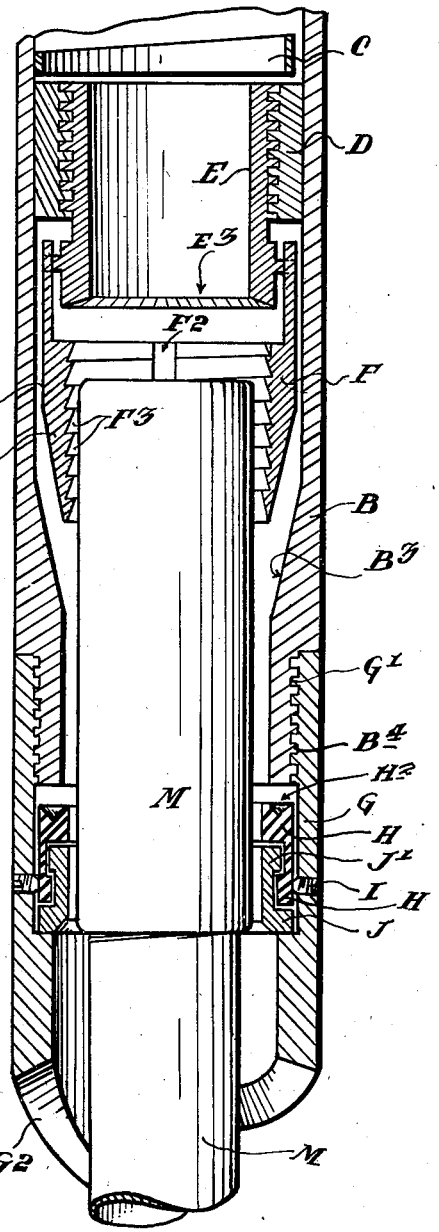
Figure 4 is a view similar to Figure 1, showing the slips disengaged or released from the tool joint.

Referring in detail to the drawings, the top of the tool body is indicated at A, A1 being the threads for connecting the body to a string of pipe. A thread A—2 is provided for connecting the part A with the main body of the tool B. A—3 is an extended sleeve which protects a spring C and also limits the upward travel of a releasing nut D to the point A—4. A thread B—1 is provided for connecting the parts A and B, and B—2 are solid keys in the body B which serve to turn the releasing nut D in the releasing operation of the fishing tool. B—3 is a taper seat in the body B which causes the gripping members F to close on the lost pipe such as indicated at M. A thread B—4 is provided for connecting a guide G to the main body B. The flat coil spring C maintains a downward pressure on the nut D and the stem E and the gripping members F, which action causes the gripping members to contact the lost pipe member M, and taper seat B—3, causing the catch position, as shown in Figure 3. The releasing nut is for the purpose of raising the hollow releasing stem E and the gripping members F to make them inoperative with the taper seat B—3, thereby effecting a release of the lost pipe M which might not be released from the well. This released position of the gripping members is shown in Figure 4. D—1 is thread for operation and raising the stem E. The gripping operation assembly is shown in Figure 1. D—2 are shoulders in keyways D—3 which limit the downward travel of the nut D by resting on top of the keys B—2 and thereby effecting the hold-up or released position of the assembly as shown in Figure 3. The keyways D—3 fit over the keys B—2 and by turning the entire fishing tool to the right with the operating string N, the keys B—2 and D—3 act together to raise the hollow releasing stem E and the gripping members, to a suspended and inoperative position, as shown in Figure 4. These keyways permit a free upward movement of the assembly and a limited downward movement. E—2 is an ear by which means is had for loose connection of the stem E and the gripping members for a release position of operation. E—3 are gripping teeth of the stem which come in contact with the lost pipe member M. The member M being stuck in the well and immovable, it holds the stem E stationary, so that the releasing nut D can be screwed down to a position to suspend the gripping members in an inoperative position—this being possible by the fact that E and F are connected together at F—1 and E—2.

In Figures 1 and 2 the gripping members F are shown ready to be run into a deep well and Figure 3 shows these members after they have been forced upward and open with the lost pipe member caught by the gripping members, wedging between taper seat B—3 and the lost pipe member M. F—1 is a slot section of gripping members F for loosely connecting them with stem E, and provides means of holding the gripping members off of taper seat to effect a release from the lost pipe member as shown in Figure 4. F—2 are the keyways in the gripping members F for clearance over the keys B—2 in assembling the complete fishing tool. F—3 are gripping teeth of gripping members and are threaded on these members with left hand teeth, so that if the releasing nut D and the stem E should become fouled, the keys B—2 would cause the entire assembly to rotate around the lost pipe member M when a release was being made, and by a right turning motion the gripping members would screw off of the lost pipe member. This provides two means for releasing the member M. F—4 is a taper section of the gripping members to cause the wedging effect in making the "catch."

A guide member is provided as indicated at G with hook extension G—2 for feeling out the lost member M and centering it for entering the fishing tool, and G—1 is a thread for connecting the guide to the main body B.

A packing rubber is provided as indicated at H for the purpose of diverting circulating liquid from the pumps at the well surface through the string of pipe N, into the lost pipe member M, in order that mud may be washed out as the member is pulled from the well. H—1 is a section of the packing rubber H adapted for securing to a steel packer retainer indicated at J, and H—2 is a Veed section of the packing rubber so shaped that circulating fluid pressure will more easily effect a pack-off at this point. The part indicated at J—1 is a clincher section of the packer retainer for the purpose of holding the packing rubber and retainer ring J in position.

In operation of the tool, it is let down into a deep well and the first contact is made at the point G—2 and the top portion of the lost object or pipe M. A slight right hand turning motion causes the member M to enter the guide G. As the fishing tool is lowered, the lost member next contacts and enters the retainer ring J and the packer rubber H. Then at that point circulation can be started from the ground pumps through the operating drill pipe N, and the washing out process of the lost pipe started. The fishing tool is further lowered and the top of the lost pipe then contacts the lower end of the gripping members F. The weight of the fishing tool and the drill pipe N then causes the gripping members to raise up and open, allowing the lost member M to enter and become engaged as is shown in Figures 3 and 5. It will be apparent that the packing rubber H has circulation directed into the lost pipe and that the gripping members F have engagement with the lost pipe, ready to pull it.

In case the lost pipe is stuck because of settling formations, the fishing tool can be released for salvage, in which case the drill pipe is lowered and rotated to the right. This releasing operation is brought about as follows: the lost pipe member M being stuck and immovable, and non-rotatable, and its top edge coming in contact with the part E—3, then the hollow releasing stem E is non-rotatable. By turning the fishing tool to the right, the keys B—2 of the body of the tool rotate, releasing the nut D and the threads D—1 and E—1, being of a right-hand form, the releasing nut D is screwed to a downward position, as in Figure 4. Now because the top of the keys B—2 stop the downward travel of the releasing nut D at the point D—2, and the gripping members F are hanging to the stem E at the points E—2 and F—1, the gripping members F are hanging in an inoperative position, as shown in Figure 4, being inoperative, because there is no longer a contact made with the taper seat B—3. After the release from the lost pipe member is brought about, as in Figure 4, the fishing tool and the operating string of pipe can be removed from the well, leaving the lost pipe therein.

The fishing tool as embodied in the invention has also another manner of releasing the lost object in the well which is stuck and immovable. In case the releasing nut D and the stem E become fouled, then nut D and stem E and gripping members F, become as one solid unit, and the keys B—2 are able to rotate them as one unit, the teeth in gripping members F being of a left hand thread, and being turned with a right hand motion, it causes the gripping members to screw off of the lost pipe. The operating string N and the fishing tool are raised up slowly as they are being turned to the right to effect a release.

While the disclosure represents a practical embodiment of a well fishing tool constructed in accordance with the invention, it is to be understood that the structure may be modified, changed and altered, in keeping with the spirit thereof, and which would be within the scope and meaning of the claims annexed hereto.

What is claimed is:

1. A fishing tool comprising a body of three sections, threadedly engaged one with the other; said tool including an assembly of parts comprising a releasing nut, a spring for providing pressure on the nut, a hollow sleeve threadedly engaged with the releasing nut and including teeth on its lower end, gripping members for engaging an object in a well, said gripping members being loosely engaged with said sleeve, and means for effecting a rotation of said releasing nut with said sleeve to raise and lower said sleeve and gripping members in the gripping and releasing of an object in a well.

2. A fishing tool comprising a body of an upper section, an intermediate section and a lower section, said sections threadedly engaged one with the other; said tool including an assembly of parts comprising a releasing nut, a spring for providing pressure on the nut, a hollow sleeve with teeth on one end and threadedly engaged with the releasing nut, said nut having a shoulder and keyways in said central section for limiting the downward travel of the nut; gripping members engaged with said sleeve for gripping an object in a well; the lower section of said body constituting a guide for directing an object into the tool, and having a packer member and a retaining member for the packer member.

3. A fishing tool as claimed in claim 2, the lower end of said intermediate section and one end of said gripping members having a tapered seat.

FRANKLIN L. LE BUS.